March 18, 1969  F. MARTI  3,433,093
RATCHET MECHANISM
Filed Oct. 7, 1966
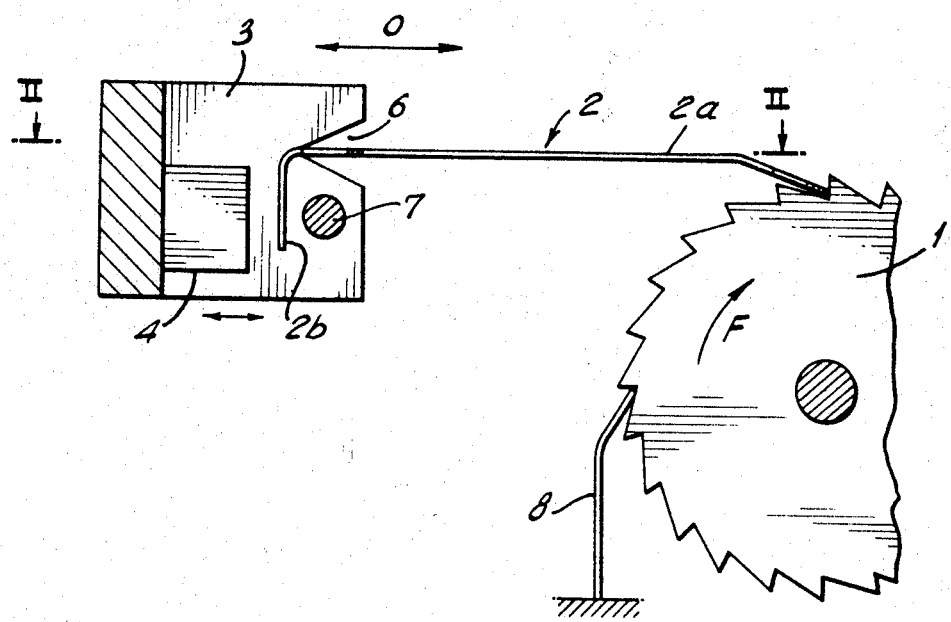
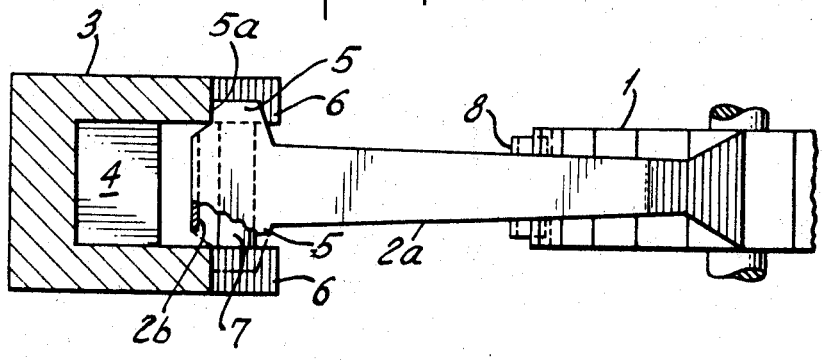
INVENTOR:
FRITZ MARTI
BY
Curtis, Morris & Safford
ATTORNEYS.

3,433,093
RATCHET MECHANISM
Fritz Marti, La Chaux-de-Fonds, Switzerland, assignor to Portescap, Le Porte-Echappement Universel S.A., La Chaux-de-Fonds, Switzerland
Filed Oct. 7, 1966, Ser. No. 585,130
Claims priority, application Switzerland, Oct. 14, 1965, 14,285/65
U.S. Cl. 74—578
Int. Cl. G05g 1/00; G04c 5/00

8 Claims

ABSTRACT OF THE DISCLOSURE

A timepiece ratchet mechanism having a ratchet wheel and a pawl. The pawl has blade-shaped arms pivotably mounted in V-shaped grooves in a mounting block. A permanent magnet holds the arms of the pawl in place in the grooves and urges the pawl into engagement with the teeth of the ratchet wheel.

---

The present invention relates to ratchet mechanisms for converting oscillatory motion into rotary motion. More particularly, this invention relates to such ratchet mechanisms for use in timepieces.

Most known ratchet mechanisms such as those used in watches and other precision devices usually include a saw-toothed ratchet wheel engaged with a pivoted driving pawl. A driving spring tends to maintain the pawl in contact with the teeth of the ratchet wheel. The pawl is coupled to and oscillates with an oscillating device such as a balance wheel. Upon each oscillation, the free end of the pawl engages the steep face of a ratchet tooth and imparts an impulse to the wheel. Then the end of the pawl slides across the more gradually inclined back edge of the next tooth. A holding pawl fastened to a stationary part of the mechanism prevents the ratchet wheel from moving back when the driving pawl moves back to engage the next tooth.

The above-described ratchet mechanism is not well adapted to precise miniaturization and the use of extremely small driving forces. For example, in many modern miniature mechanisms such as watches, the drive spring is very small. Typically, it has a thickness of the order of only a few hundredths of a millimeter, and supplies a drive force of the order of only a milligram. The frictional engagement of the parts of such a prior mechanism often causes substantial frictional losses. Also, there is a certain amount of "play" between the cylindrical pin on which the pawl rotates and its mounting. This adversely affects the oscillation of the mechanism and introduces an element of variable and unstable damping into the movement.

A major object of the present invention is to provide a simple, durable ratchet mechanism overcoming the above described deficiencies. It is a further object to provide such a mechanism which is well-adapted to miniaturization, and operates smoothly without lubrication but with extremely low friction and wear.

In the drawings:

FIGURE 1 is a cross-sectional, partially broken-away and schematic view of the preferred embodiment of the invention; and FIGURE 2 is a cross-sectional view taken along line II—II of FIGURE 1.

The ratchet mechanism shown in the drawings comprises a conventional saw-toothed ratchet wheel 1 which is rotated in the direction indicated by the arrow F by a novel drive pawl 2. The drive pawl 2 is pivotally mounted in a U-shaped support member 3 which is oscillated forwardly and backwardly in the direction indicated by the arrow O by suitable oscillating means (not shown), such as a tuning fork or "torsion" type vibrator. Vibrators suitable for this purpose are shown in detail in my copending U.S. patent applications entitled: "Vibrator Device," Ser. No. 585,095; and "Oscillator Device for Timepiece Mechanisms," Ser. No. 585,129, both filed on the same day as this patent application. The disclosures in those patent applications hereby are incorporated herein by reference.

The drive pawl 2 consists of a blade of magnetically permeable material bent in the shape of a figure L, the longest arm 2a of which rests at its free end against the toothed periphery of the ratchet wheel 1 while the shorter arm or heel 2b is suspended between the two sides of the U-shaped support member 3. A small permanent magnet 4 is fastened to the rear wall of the member 3 by any suitable means such as gluing. The arm 2a has, in the immediate vicinity of its bend, two lateral projections 5. The rear edge 5a of each projection 5 rests in the bottom of a horizontal V-shaped recess 6 in each side of the support member 3. The magnet 4 exerts a permanent magnetic attraction on the heel 2b of the driving pawl 2. This attraction has the effect of pulling the pawl 2 rearwardly so that the edges 5a of its projections 5 are held in the bottoms of the V-shaped recesses 6 of the support member 3. Thus, the bottoms of the V-shaped recesses constitute the bearing surfaces for the pivoting of the pawl 2 as it moves upwardly and downwardly. The pull exerted on the heel 2b of pawl 2 exerts a clockwise torque on the arm 2 or about the pivot points at the bottoms of the V-shaped notches. This torque presses the free end of the arm 2a downwardly against the toothed periphery of the ratchet wheel 1.

A pin 7 is fastened between the two sides of the support member 2. Pin 7 limits the pivoting of the pawl 2 and prevents it from being dislodged from its seats at the bottoms of the V-shaped recesses of the support member 3 when the ratchet mechanism is jarred. A resilient holding pawl 8 which is fastened to a stationary part of the ratchet mechanism engages the ratchet wheel 1 and prevents it from moving backward after an impulse has been imparted to the wheel by the pawl 2. Alternatively, a magnetic pawl mehanism similar to that of the present invention can be used in place of the resilient pawl 8.

The ratchet mechanism described above operates as follows: when the support member 3 moves to the right, the pawl arm 2a moves to the right while its right end is in engagement with the sharply inclined front edge of a tooth on the ratchet wheel 1, thus rotating the wheel one step in a clockwise direction. When the support member 3 moves back to the left, the attraction of the permanent magnet 4 holds the edges 5a of the projections in the bottoms of the grooves in the support member 3, and thrusts the arm 2a downwardly. Thus, the arm 2a moves rearwardly with support member 3, and the right end of arm 2a slides across the gradually inclined rear edge of the next tooth, and then downwardly into engagement with its front edge. The above-described cycle is repeated for every oscillation of the support member 3.

The force which thrusts the right end of arm 2a downwardly can be adjusted by adjusting the ratio between the lengths of the arms 2a and 2b. Thus, it is possible to obtain such forces of very small magnitude, for example, of the order of a few milligrams, quite well adapted for use in miniature watch mechanisms.

The above-described ratchet mechanism makes it possible to give the blade of the driving pawl 2 sufficient thickness to resist its being accidentally bent, and provides this advantage without reducing the operating speed and responsiveness of the mechanism. The rotation of the pawl 2 on the rear edges 5a of the lateral projections engaging the bearing surfaces in the V-shapde grooves minimizes frictional losses without lubrication of the bearing surfaces. Since the projections 5 are held firmly at the bottoms of the V-shaped grooves by the force of attraction of the magnet 4, the pivotal movement of the pawl is smooth and substantially without fluctuation. The magnet 4 preferably is made of a material having high magnetic retentivity and thus retains its force of attraction practically indefinitely. The magnitude of this force of attraction easily can be adjusted by adjusting the distance between the magnet and the heel 2b of the pawl 2.

The above description of the invention is intended to be illustrative and not limiting. Various changes or modifications in the embodiments described may occur to those skilled in the art and these can be made without departing from the spirit or scope of the invention as set forth in the claims.

What is claimed is:

1. A ratchet mechanism comprising, in combination, a ratchet wheel, a driving pawl engaging said ratchet wheel, a movable support member having at least one groove in it, said pawl having a blade-like portion pivotally bearing upon the bottom of said groove.

2. Apparatus as in claim 1 in which said driving pawl is made of magnetically permeable material, and including magnetic means near said blade for holding said blade portion in said groove.

3. Apparatus as in claim 2 in which said pawl is elongated and has a bent end portion adjacent said magnetic means, the pivot axis formed by the engagement of said blade-like portion and said groove being located inwardly from said bent end portion.

4. Apparatus as in claim 3 in which the other end of said pawl bears substantially tangentially against the edge of said ratchet wheel.

5. Apparatus as in claim 1 in which said movable support member is U-shaped with two of said grooves, one at each end of the arms of the U, and said blade-like portions of said pawl being lateral projections from said pawl.

6. Apparatus as in claim 5 in which said pawl is elongated and has a bent end portion, a permanent magnet affixed to said support member near said bent end portion within the enclosure of the arms of the U, said projections being positioned inwardly from said end portion of said pawl.

7. Apparatus as in claim 6 including a stop member in said support member limiting the pivotal movement of said bent end portion of said pawl, and a second pawl engaging said ratchet wheel to prevent its rotation in a direction opposite to that in which it is driven by the first pawl.

8. In a watch mechanism, a ratchet drive device comprising, in combination, a ratchet wheel, a pivotably mounted pawl member having one end engaging said ratchet wheel, magnetic means mounted near said pawl member for magnetically pulling said pawl member toward said ratchet wheel, said pawl member having at least one blade-like pivot portion, a mounting member with a groove in it, said blade-like pivot portion resting in said groove, and said magnetic means being positioned so as to pull said pivot portion into said groove.

References Cited

UNITED STATES PATENTS

| | | | |
|---|---|---|---|
| 2,868,026 | 1/1959 | Finehout et al. | 74—578 XR |
| 3,184,981 | 5/1965 | Bennett et al. | 74—575 XR |

FOREIGN PATENTS

| | | |
|---|---|---|
| 756,807 | 9/1956 | Great Britain. |

FRED C. MATTERN, JR., *Primary Examiner.*

F. D. SHOEMAKER, *Assistant Examiner.*

U.S. Cl. X.R.

74—142; 58—23; 339—99, 176